Aug. 23, 1927.
J. GREENER
BUTTER MOLD
Filed Nov. 1, 1926
1,639,937
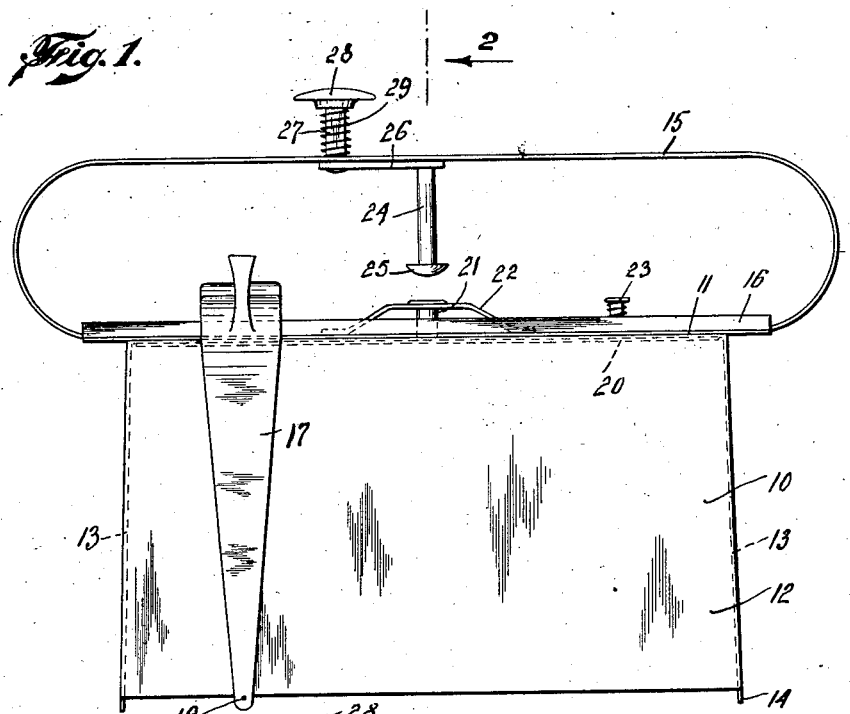
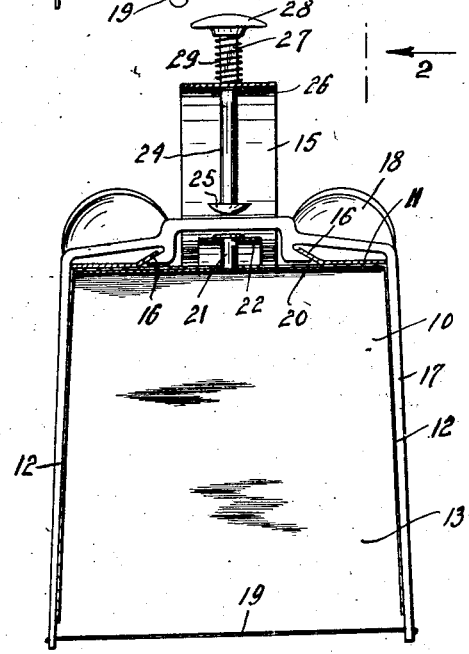
INVENTOR
J. Greener
BY
ATTORNEY Patented Aug. 23, 1927.

1,639,937

UNITED STATES PATENT OFFICE.

JOSEPH GREENER, OF NEW YORK, N. Y.

BUTTER MOLD.

Application filed November 1, 1926. Serial No. 145,508.

The present invention relates to improvements in molding devices, and more particularly to an implement for molding butter blocks of a predetermined size and weight, which blocks are sold in the trade under the name of "print butter." These blocks are molded in dairies by means of rather complicated machinery.

The main object of the present invention is to provide a simple and inexpensive contrivance for molding butter, more particularly a hand-implement which is adapted to be used by the retail merchant for the purpose of providing print butter from a mass, as it is furnished in tubs to the retail merchant.

With these and other objects in view, which will more fully appear as the nature of the invention is better understood, the same consists in the combination, arrangement and construction of parts hereinafter described, pointed out in the appended claim and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 1 is a side elevation of a butter mold constructed in accordance with the present invention; and Fig. 2 is a section taken on line 2—2 of Fig. 1.

In the drawings, the numeral 10 indicates a rectangular mold, preferably, made of sheet metal, and comprising a top 11, side walls 12 and end walls 13. The lower edges 14 of the end walls 13 project below the free edges of the side walls, for a purpose hereinafter to be described. Both the side and end walls are somewhat wider at their bottom edges than at their top edges, as clearly appears from the drawings, for the purpose of facilitating the ejecting of the butter block from the mold. The mold is provided with a handle 15 of any suitable configuration, the said handle being suitably attached to the mold top. On the mold top extend lengthwise guides 16, with which is engaged the frame 17 of a cutting device. This frame is substantially U-shaped in configuration and extends transversely of the mold, it being provided with finger pieces 18, by means of which it may be conveniently manipulated, that is to say shifted from end to end on the mold. The lower edges of the legs of the U-shaped frame are connected by a wire 19, which is stretched across the mold and serves to sever from the bulk the material forced into the mold. The wire 19 abuts against the free edges of the side walls 12 of the mold, the portions of the end walls which project below the free edges of the side walls preventing a disengagement of the cutter from the mold.

The mold is provided with an ejector, comprising a plate member 20 which extends in parallel relation to and is of the contour and size of the top 11. This plate member has centrally attached to it a plunger 21, which extends through the mold top and has fixed to it above the said top a blade spring 22, the ends of which abut against the outer face of the top. For the purpose of limiting the upward movement of the plate member in relation to the mold top, stop screws 23 are extended through screw-threaded holes in the mold top, their heads being disposed above the mold top, while their lower ends abut against the upper face of said plate member. By means of these stop screws, the size of the mold may be varied. This is desirable in view of the fact that the specific gravity of butter shipments varies. The molds are of a size to provide butter blocks of predetermined weights. The position of the plate member within the mold is adjusted to take care of the variation in the specific gravity of each shipment. With the plunger 21 co-operates a pin 24, having a head 25 at its lower end, which is adapted to bear against the plunger 21. This pin is fixed to an arm 26, disposed below the handle 15 and having attached to it a spindle 27, which extends through the said handle and is provided above the latter with a knob 28. A spring 29 is coiled about the spindle 27, one end of the same bearing against the knob 28, while its other end bears against the handle 15. This spring has a tendency to keep the pin 24 in its elevated position. The arm 26 is provided to position the knob 28 at a suitable distance from the center of the handle, so as not to interfere with the proper operation of the mold in forcing the latter into the mass of butter.

The operation of this device is as follows: The ejector plate is first adjusted in relation to the mold top, as above stated. The cutter frame, with the wire cutter 19 thereon, is then shifted toward one of the end walls of the mold, until the said wire cutter abuts against the said end wall. The mold is then forced into the mass of butter until the ejector plate abuts against the lower ends of the stop screws 23. The cutter is then moved from end wall to end wall of the mold, whereby a block of butter is severed from the mass. The operator then forces, by the aid of the knob 28, the pin 24 downwards, its head 25 abutting against the plunger 21 and, in the continued movement of the said pin, moving the ejector plate toward the free edges of the side and end walls of the mold, thus ejecting the butter block from the mold.

From the foregoing it appears that the device herein described not only serves as a mold but also as a weighing apparatus, it being obvious that when the ejector plate is once adjusted as above described, butter blocks of a predetermined weight will be formed, depending upon the size of the mold. Inasmuch as butter is usually sold in 1 lb., ½ lb. and ¼ lb. pieces, it is obvious that a merchant needs only three molds, the adjustment above described taking care of the variations in the specific gravity of the butter shipments.

What I claim is:

A device for molding butter blocks, comprising a mold composed of a top, side walls and end walls, a bail-shaped handle attached to said top, an ejector plate within said mold extending in parallel relation to said top, a plunger on said ejector plate extending through said top, a pin shiftably mounted upon said handle in alignment with said plunger and provided with a head at its lower end adapted to bear against said plunger, a spring co-operating with said pin for normally holding the latter disengaged from said plunger, two parallel longitudinal guides upon the exterior of said top, a U-shaped frame extending transversely of the mold mounted upon said guides, and a cutter wire on said frame extending across said mold, the lower edges of said end walls projecting below the free edges of said side walls and thus forming stops for said cutter wire.

Signed at New York, in the county of New York, and State of New York, this 6th day of August, A. D. 1926.

JOSEPH GREENER.